United States Patent
Fruge

(10) Patent No.: US 8,579,514 B2
(45) Date of Patent: Nov. 12, 2013

(54) PRESS FITTING A CARTRIDGE BEARING

(75) Inventor: Tave Joseph Fruge, Louisville, CO (US)

(73) Assignee: Seagate Technology LLC, Cupertino, CA (US)

( * ) Notice: Subject to any disclaimer, the term of this patent is extended or adjusted under 35 U.S.C. 154(b) by 730 days.

(21) Appl. No.: 12/767,520

(22) Filed: Apr. 26, 2010

(65) Prior Publication Data

US 2011/0262066 A1 Oct. 27, 2011

(51) Int. Cl.
 *F16C 43/00* (2006.01)
 *F16C 27/00* (2006.01)
(52) U.S. Cl.
 USPC .......................................... 384/537; 384/535
(58) Field of Classification Search
 USPC ......... 384/441, 490, 492, 504, 512, 513, 517, 384/520, 535–537, 543, 581, 582, 584; 360/265.2–265.6
 See application file for complete search history.

(56) References Cited

U.S. PATENT DOCUMENTS

| | | | |
|---|---|---|---|
| 5,315,465 A | 5/1994 | Blanks | |
| 5,446,608 A * | 8/1995 | Sanada | 360/265.2 |
| 5,473,489 A * | 12/1995 | Sanada | 360/265.6 |
| 5,727,882 A | 3/1998 | Butler et al. | |
| 6,018,441 A | 1/2000 | Wu et al. | |
| 6,342,992 B1 * | 1/2002 | Prater et al. | 384/296 |
| 6,574,076 B1 * | 6/2003 | Koyama | 360/265.3 |
| 6,606,224 B2 | 8/2003 | Macpherson et al. | |
| 6,995,955 B2 * | 2/2006 | Koyama | 384/546 |
| 7,054,111 B2 | 5/2006 | Dominguez, Jr. et al. | |
| 7,072,148 B2 * | 7/2006 | Tsuchiya | 384/130 |
| 2004/0246627 A1 * | 12/2004 | Durrum et al. | 360/265.6 |

* cited by examiner

*Primary Examiner* — James Pilkington
(74) *Attorney, Agent, or Firm* — Mitchell K. McCarthy; McCarthy Law Group

(57) ABSTRACT

An apparatus and associated method involving an actuator assembly having an actuator body defining a bore and a bearing assembly in the bore. The bearing assembly has a shaft, and further has a bearing having an inner race that is affixed to the shaft and an outer race that is rotatable relative to the inner race. The bearing also has a sleeve defining an annular rigid portion circumscribing the outer race and affixed thereto. The sleeve further defines an annular predictably deformable portion depending from the rigid portion that is entirely disposed longitudinally distant from the outer race and sized to deform when press fit into the bore to operably align the shaft in the bore.

18 Claims, 6 Drawing Sheets

PRESS FITTING A CARTRIDGE BEARING

SUMMARY

In some embodiments an actuator assembly is provided having an actuator body defining a bore and a bearing assembly in the bore. The bearing assembly has a shaft, and further has a bearing having an inner race that is affixed to the shaft and an outer race that is rotatable relative to the inner race. The bearing also has a sleeve defining an annular rigid portion circumscribing the outer race and affixed thereto. The sleeve further defines an annular predictably deformable portion depending from the rigid portion that is entirely disposed longitudinally distant from the outer race and sized to deform when press fit into the bore to operably align the shaft in the bore.

In some embodiments a method is provided including steps of obtaining an actuator body defining a bore; obtaining a bearing assembly having a shaft, a bearing having an inner race that is affixed to the shaft and an outer race that is rotatable relative to the inner race, and a sleeve having a rigid portion circumscribing the outer race and affixed thereto, and having a predictably deformable portion depending from the rigid portion and entirely disposed longitudinally distant from the outer race, the deformable portion defining a diameter that is nominally larger than the bore; and inserting the bearing assembly into the bore so that the deformable portion press fits into the bore.

In some embodiments an actuator assembly is provided having an actuator defining a bore, and means for press fitting a cartridge bearing assembly into the bore by deforming selected predefined portions of the cartridge bearing assembly without deforming or displacing bearing surfaces of opposing races in the cartridge bearing assembly and thereby not adversely affecting performance of the bearing.

DESCRIPTION

A disc drive is generally a type of data storage device that transfers data to and from one or more (two or more a "stack" of) data storage discs having storage tracks. An actuator assembly selectively moves a corresponding number of data transfer members radially across each disc to access a selected track, and the disc is mounted for rotation on a motor to present different circumferential portions of a particular selected track to the data transfer member.

A rotary type of actuator assembly has an actuator body that is selectively pivoted around a bearing. Press fitting a rotatable portion of the bearing into a bore formed in the actuator body is an efficient manufacturing process for affixing the actuator and bearing in rotation together. However, the interference fit relationship associated with press fitting mating parts together is problematic in maintaining the requisite concentricity between bearing surfaces in the bearing. Improvements in the art are needed to ensure the necessary integrity of the press fit assembly while negating the adverse effects of distortion imparted to the bearing.

Figure 1:
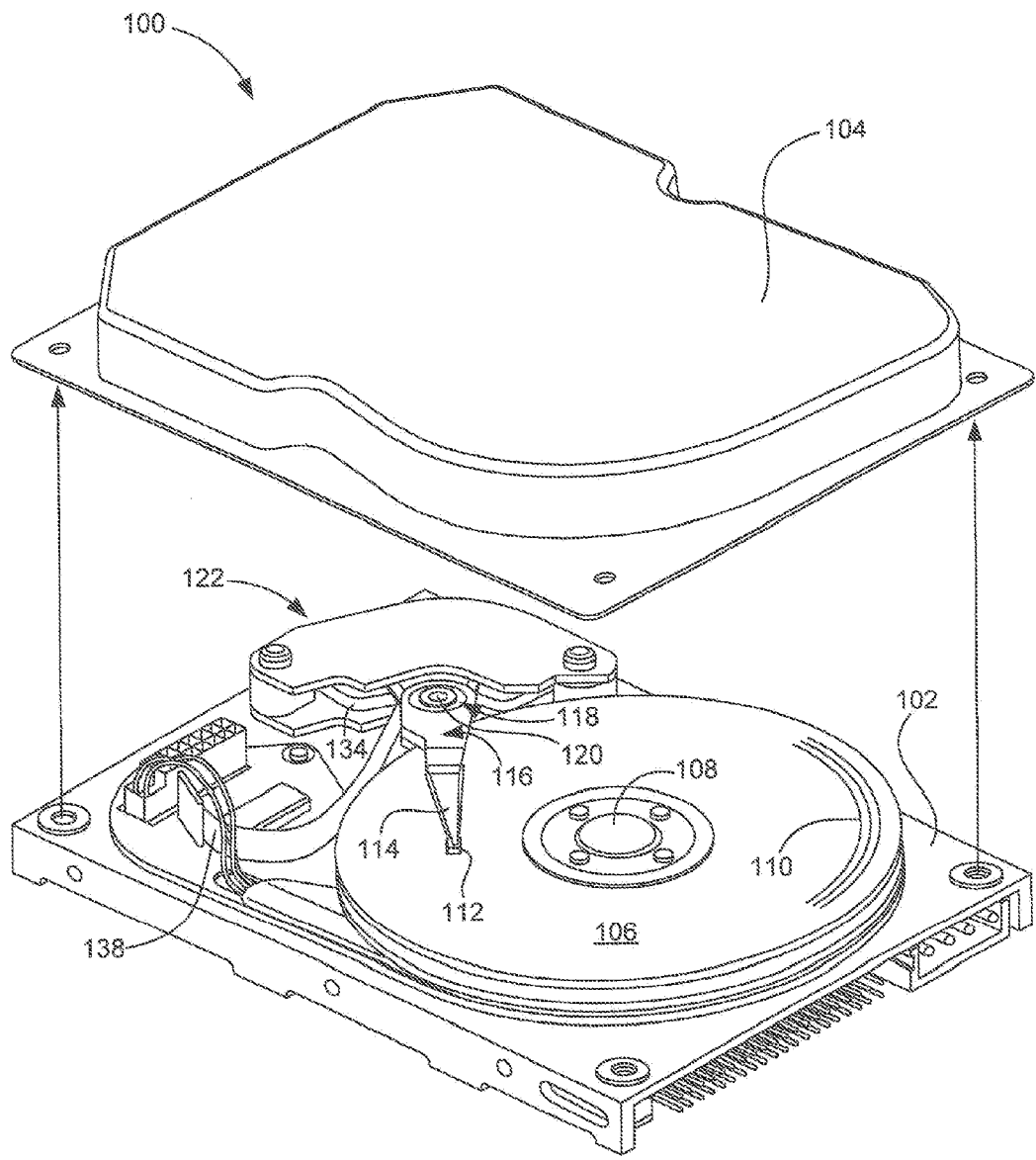
FIG. 1 is a partially exploded isometric depiction of a data storage device that is constructed in accordance with embodiments of the present invention.

Turning now to the drawings collectively and at first specifically to FIG. 1, shown is an exploded view of an example of a disc drive 100 that is constructed in accordance with the present embodiments. The disc drive 100 includes a deck 102 and a cover 104 which cooperatively form a sealed housing which encloses internal components and isolates the components from external contaminants. One or more discs 106 (two depicted) are mounted for rotation on a motor 108. The discs 106 include data storage surfaces demarcated by a plurality of data tracks 110 where data are recorded and retrieved via an array of vertically aligned heads 112. The heads 112 are supported by flexures 114, which are attached to arm portions of an actuator 116. The actuator 116 is mounted to a bearing assembly 118 which includes a stationary pivot shaft 120 around which the actuator 116 is selectively pivoted by actuation of a voice coil motor 122. The actuator 116 and bearing assembly 118 in combination is referred to herein as an actuator assembly.

Figure 2:
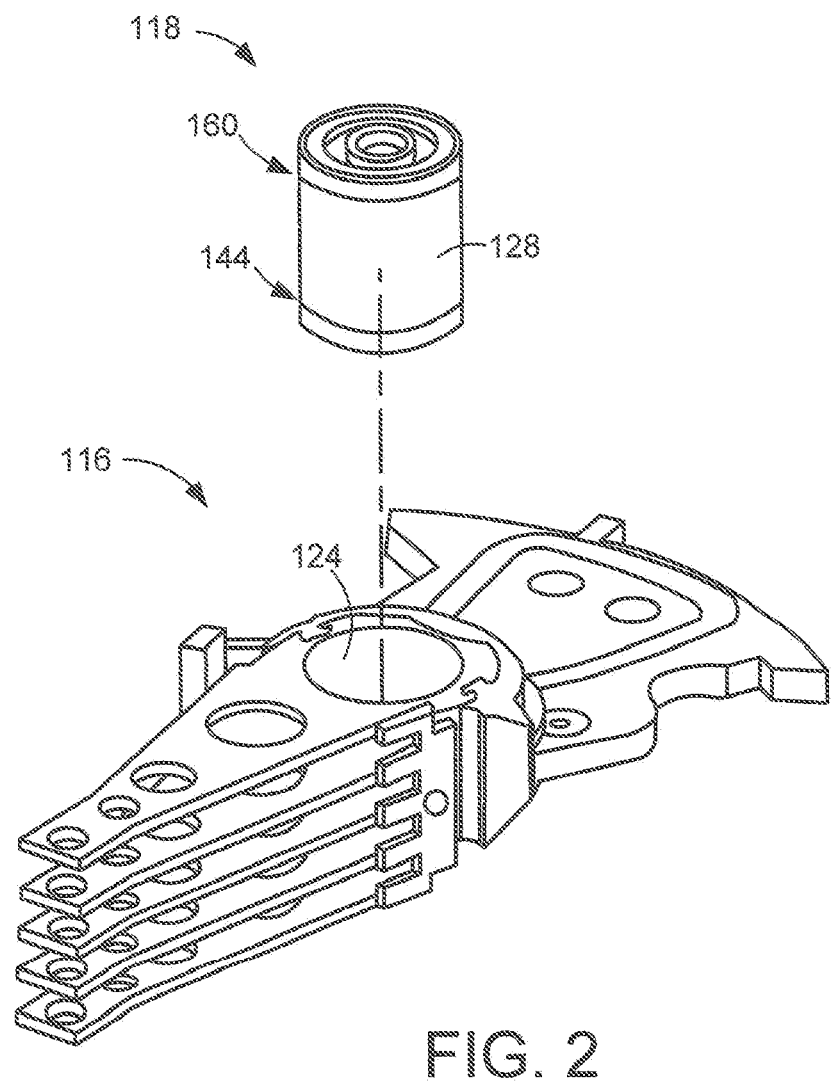
FIG. 2 is a partially exploded isometric depiction of the actuator assembly of the data storage device of FIG. 1.

FIG. 2 is an isometric partially-exploded depiction of the actuator assembly of FIG. 1. The following illustrative embodiments employ a stepped bore in the actuator 116 and deformable portions in the bearing assembly 118 at opposing ends thereof, so that the bearing assembly 118 is sized to provide a slip fit insertion of the bearing assembly 118 with only the deformable portions being press fit. That arrangement advantageously minimizes the longitudinal extent of the interference fit between the actuator 116 bore and the bearing assembly 118, thereby reducing deformatation and particulate generation. However, the skilled artisan will readily understand that the use of the described stepped bore is merely illustrative and not limiting of the present embodiments, in that in alternative embodiments the actuator can have a straight bore with the deformable portions being press fit longitudinally throughout the extent that they are inserted in the bore. In yet other alternative embodiments of the present invention the press fitting operation can be replaced with a different manner of providing a mechanical frictional interference fit. For example, without limitation, the actuator can be momentarily heated to expand and/or the bearing assembly can be momentarily cooled to contract, and then the parts can be slip fit assembled together. After being no assembled, recovery from the momentary expansions and/or contractions causes the desired interference fit.

Turning to the illustrative embodiments, the actuator 116 defines a stepped bore defining a first bore 124 and a concentric second bore 126 (FIG. 3) that defines a smaller diameter than the diameter of the first bore 124. The bearing assembly 118 includes on outermost sleeve 128 that has predefined features that are sized to press fit into the bores 124, 126.

Figure 3:
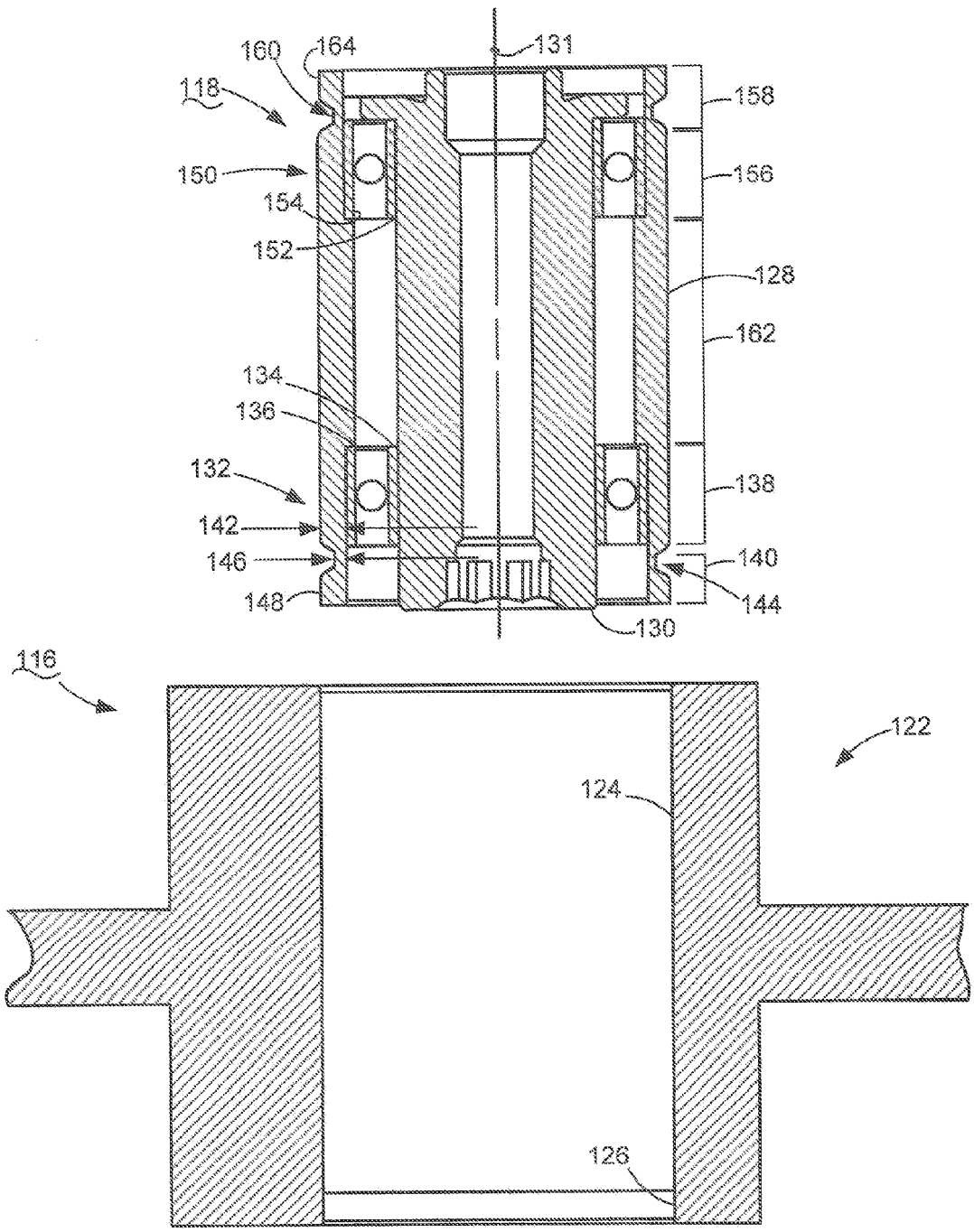
FIG. 3 is a cross sectional partially exploded depiction of the actuator assembly of FIG. 2.

FIG. 3 is a cross-sectional partially exploded depiction of the actuator assembly of FIG. 1. In these illustrative embodiments the bearing assembly 118 has a stationary shaft 130 defining a longitudinal passage centered on a longitudinal axis 131 to receive a fastener (not shown) for attaching the shaft 130 to at least one of the base 102 and cover 104. It is readily understood to the skilled artisan that in alternative embodiments the shaft 130 can be attached by other structural connections than those disclosed here without departing from the scope of the claimed embodiments. The skilled artisan also readily understands that in alternative embodiments the shaft can be rotatable without departing from the scope of the claimed embodiments. Furthermore, although the depicted embodiments describes the bearing assembly 118 being press fit from above the actuator 116, in alternative embodiments the bearing assembly 118 can be press fit from below the actuator 116 with appropriately modified configurations without departing from the scope of the claimed embodiments.

The bearing assembly 118 has a first bearing 132 having an inner race 134 that is affixed to the shaft 130 and an outer race 136 that is rotatable relative to the inner race 134. The sleeve 128 defines an annular rigid portion 138 circumscribing the outer race 136 and affixed thereto. The sleeve 128 also defines an annular predictably deformable portion 140 depending from the rigid portion 138 and entirely disposed longitudinally distant from the bearing 132. By "deformable portion" it is meant a structural portion that is by design intentionally and predictably deformed, either plastically or elastically, by a press fitting operation to provide the interference fit, thereby directing the interference fit and its concomitant distortion in the sleeve 128 away from the first bearing 132. The deformable portion 140 deforms under compressive forces as it is press fit into the actuator 116.

The rigid portion 138 of the sleeve has a first thickness 142. The deformable portion 140 includes an indentation 144 that has a second minimum thickness 146 that is less than the first thickness 142. The indentation 144 effectively scores the sleeve 128 so that the deformation during press fitting is limited to the deformable portion 140, thereby preventing the deformation from propagating to the rigid portion 138 to any extent such that it would impair the performance of the bearing 132. Impaired performance would certainly result from distorting or displacing the faces of the races 134, 136 that contactingly engage the roller elements in the illustrative bearing 132 in FIG. 3. Preferably, the indentation 144 extends annularly around the longitudinal axis 131, but in alternative embodiments the indentation 144 can be segmented.

By "longitudinally distant," it is meant that the deformable portion 140 is longitudinally spaced away from the bearing 132 so that deformation does not adversely alter the concentricity of the rigid portion 138 with respect to the bearing 132. By scoring the sleeve 128 with a reduced wall thickness feature as depicted, it is predictable that all deformation of the sleeve 128 during press fitting occurs longitudinally away, or "distant," from the bearing 132, and particularly away from the outer race 136 so as to ensure no deformation as a result of the press fitting operation is imparted to the bearing 132.

Figure 4:
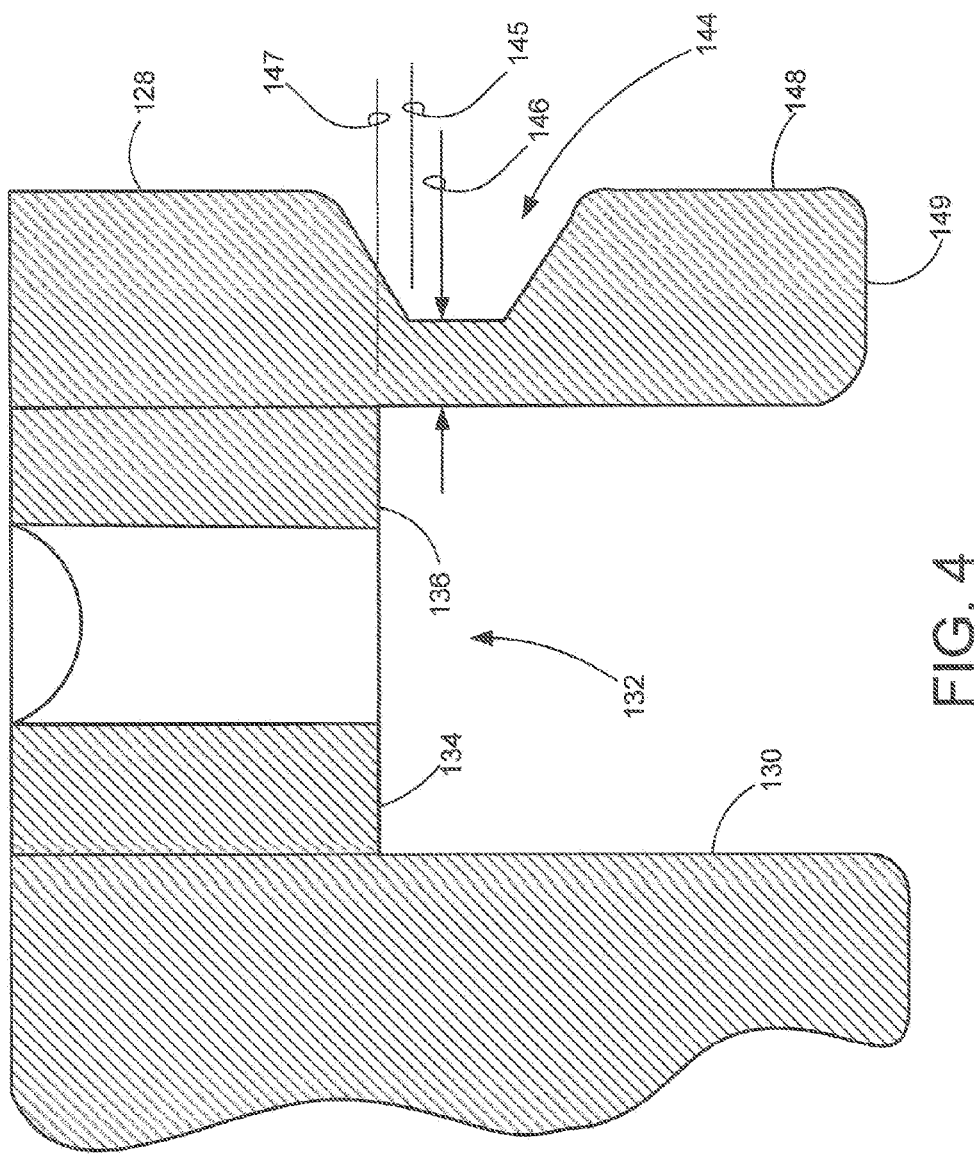
FIG. 4 is an enlarged portion of FIG. 3.

FIG. 4 is an enlarged portion of FIG. 3 focusing on the relationship between the indentation 144 and the bearing 132. The claimed embodiments are not limited to the illustrative trapezoidal-shaped indentation 144, any shaped indentation is purposed to effectively score the sleeve 128 to direct the deformation in the sleeve 128 longitudinally beyond that portion supported by the bearing 132. In these illustrative embodiments the characteristic deformation of the deformable portion 140 will depend on the placement of the weakest area, the minimum thickness 146 of the sleeve 128. Generally, it has been determined that the deformation will be satisfactorily isolated, or "longitudinally distant," from the bearing 132 so long as the longitudinal extent 145 of the minimum thickness 146 is at the longitudinal extent 147 of the races 134, 136 or between there and the end 149 of the deformable portion 140.

Figure 6:
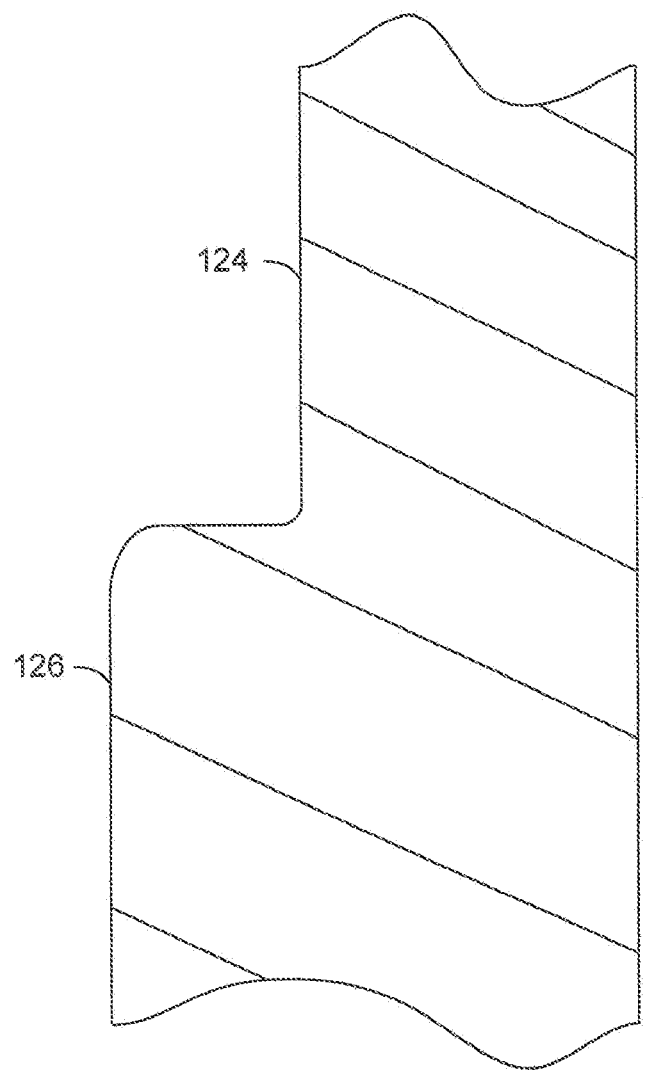
FIG. 6 is an enlarged cross sectional depiction of a portion of the actuator at the stepped bore.

Returning to FIG. 3, the rigid portion 138 defines a diameter that is sized to slip fit while longitudinally traversing the first bore 124 as the bearing assembly 118 is inserted into the actuator 116. The deformable portion 140 also has a cylindrical surface 148 on the opposing side of the detent 144 that defines a diameter that is substantially the same as the rigid portion diameter 138. This permits a slip fit insertion of the bearing assembly 118 into the bore 124. For purposes of this description, "slip fit" means a mechanical clearance between the mating parts that permits the bearing assembly 118 to slidingly engage along the bore 124 without physical deformation to either of the mating parts. The bearing assembly 118 is ultimately partially press fit into the actuator 116 by press fitting the deformable portion 140 into the reduced diameter bore 126. FIG. 6 is an enlarged cross sectional depiction of the actuator 116 showing the bore 124 and the reduced bore 126.

The bearing assembly 118 has another bearing 150 that likewise has an inner race 152 that is affixed to the shaft 130 and an outer race 154 that is rotatable relative to the inner race 152. Similar to that described above, the sleeve 128 defines another respective annular rigid portion 156 circumscribing the outer race 154 and affixed thereto. The sleeve 128 further defines another respective annular deformable portion 158 depending from the rigid portion 156 and disposed longitudinally distant from the bearing 150. The deformable portion 158 defines an indentation 160 that, like the indentation 144, defines a reduced thickness in comparison to the thickness of the rigid portion 156 to limit deformation from a press fitting operation to the deformable portion 158. The indentation 160 can extend annularly around the longitudinal axis 131, or alternatively the indentation 160 can be segmented.

The sleeve 128 defines an annular cylindrical medial portion 162 connecting the rigid portions 138, 156 together. The deformable portion 140, the medial portion 162, and the rigid portions 138, 156 all define diameters that slip fit the bore 124 as the bearing assembly 118 is inserted into the actuator 116. The deformable portion 158 further has a cylindrical surface 164 longitudinally beyond the indentation 160 defining a diameter that is greater than the diameter of the bore 124. The bearing assembly 118 is thereby ultimately partially press fit into the actuator 116 by press fitting the deformable portion 158 into the bore 124 to align the shaft 130 in the bore 124.

Figure 5:
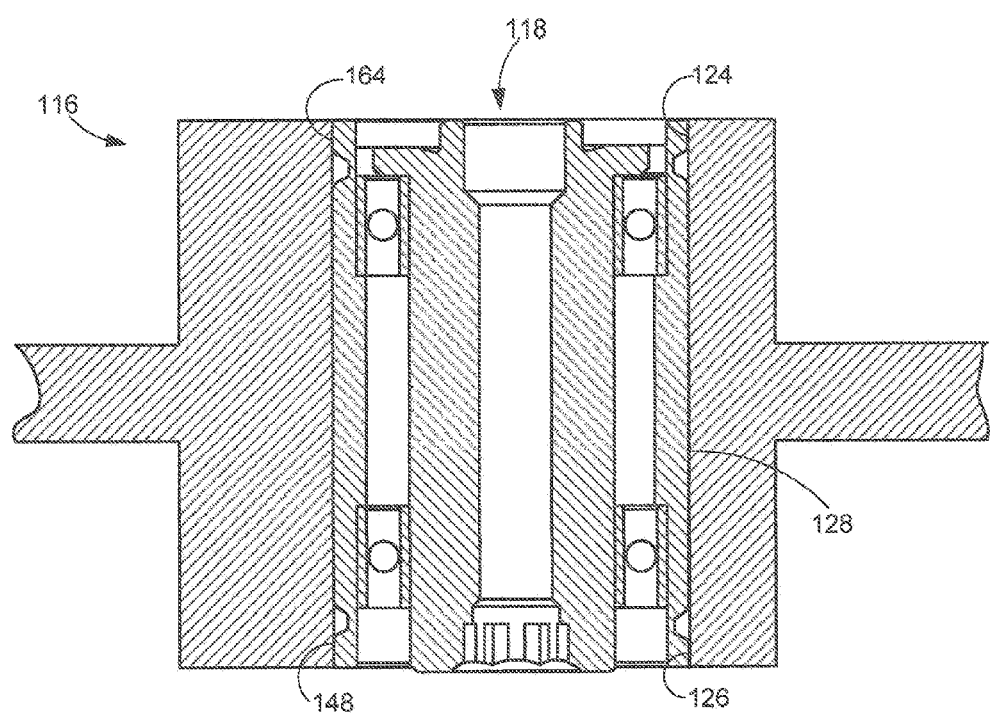
FIG. 5 is a cross sectional depiction of the bearing assembly press fit into the actuator forming the actuator assembly in the data storage device of FIG. 1.

FIG. 5 depicts the final assembly configuration where the surface 148 is press fit into the bore 126 at the lower end and the cylindrical surface 164 is press fit into the bore 124 at the upper end. Note that no other portion of the sleeve 128 between the surfaces 148, 164 is press fit in these illustrative embodiments, as described, thereby minimizing the amount of deformation necessary to obtain the press fit and isolating the press fit deformation no as to be longitudinally distant from the bearings 132, 150.

The disclosed embodiments generally contemplate an apparatus and associated method for using an actuator assembly having an actuator defining a bore, and means for press fitting a bearing assembly into the bore by deforming selected predefined portions of the bearing assembly without adversely deforming or displacing bearing surfaces of opposing races in the bearing assembly. For purposes of this description, the term "means for press fitting" encompasses the disclosed structure and structural equivalents thereof that are capable press fitting a bearing without altering the bearing performance due to deforming or displacing the bearing surfaces of opposing races in the bearing. For example, the disclosed embodiments employ detents 144, 160 defining minimum thicknesses that are longitudinally beyond the ends of the respective bearings 132, 150. The detents 144, 160 have been described as parts of respective predictably deformable portions 140, 158 that are compressible without adversely affecting the faces of the respective races 134, 136 and 152, 154 that contactingly engage roller ball elements in the bearings 132, 150. Although not explicitly depicted, other types of roller elements are contemplated within the meaning of "means for press lifting" including but not limited to rolling cylindrical elements, fluid elements, and the like. A complete enumeration of all types of bearings contemplated by the meaning of "means for press fitting" is unnecessary for the skilled artisan to understand the meaning of the term, and so no such enumeration is attempted.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms.

What is claimed:

1. An actuator assembly comprising:
   an actuator body defining a bore; and
   a bearing assembly comprising:
      a shaft;
      a bearing having an inner race that is affixed to the shaft and an outer race that is rotatable relative to the inner race; and
      a sleeve having an annular rigid portion circumscribing the outer race and affixed thereto, and further having an annular deformable portion depending from the rigid portion defining an indentation in the sleeve, the indentation forming a minimum thickness of the sleeve that is entirely disposed longitudinally distant from the outer race, the deformable portion sized to deform when press fit into the bore to operably align the shaft in the bore.

2. The actuator assembly of claim 1 wherein the indentation extends annularly around a longitudinal axis of the shaft.

3. The actuator assembly of claim 2 wherein the bore is stepped and defined by a first bore and a concentric second bore having a smaller diameter than the diameter of the first bore, the rigid portion defines a first diameter on one side of the indentation providing a slip fit with the first bore, and wherein the deformable portion defines a cylindrical surface on the opposing side of the indentation having a second diameter that is substantially the same as the first diameter, the cylindrical surface sized to provide a press fit in the second bore.

4. The actuator assembly of claim 3 wherein the bearing is characterized as a first bearing and the rigid portion is characterized as a first rigid portion and the deformable portion is characterized as a first deformable portion, the bearing assembly having a second bearing having an inner race that is affixed to the shaft and an outer race that is rotatable relative to the second bearing's inner race, the sleeve having a second rigid portion circumscribing the second bearing's outer race and affixed thereto, and the sleeve further having a second deformable portion depending from the second rigid portion and sized to deform when press fit into the first bore to operably align the shaft in the first bore.

5. The actuator assembly of claim 4 wherein the indentation is characterized as a first indentation, the second deformable portion defining a second indentation in the sleeve forming a thickness that is less than a thickness of the second rigid portion.

6. The actuator assembly of claim 5 wherein the second indentation extends annularly around the longitudinal axis of the shaft.

7. The actuator assembly of claim 6 wherein the second rigid portion defines a diameter that is substantially the same as the first diameter of the first rigid portion on one side of the second indentation providing the slip fit with the first bore, and wherein the second deformable portion has a cylindrical surface on the opposing side of the second indentation defining a third diameter that is greater than the first diameter.

8. The actuator assembly of claim 7 wherein the sleeve defines a cylindrical portion connecting the first rigid portion and the second rigid portion together, the first deformable portion being disposed longitudinally opposite the cylindrical portion in relation to the first rigid portion and the second deformable portion being disposed longitudinally opposite the cylindrical portion in relation to the second rigid portion.

9. A method comprising:
   obtaining an actuator body defining a bore;
   obtaining a bearing assembly having a shaft, a bearing having an inner race that is affixed to the shaft and an outer race that is rotatable relative to the inner race, a sleeve having a rigid portion circumscribing the outer race and affixed thereto, and having a deformable portion depending from the rigid portion defining an indentation in the sleeve, the indentation forming a minimum thickness of the sleeve that is entirely disposed longitudinally distant from the outer race, the deformable portion also defining a diameter that is larger than the bore;
   inserting the bearing assembly into the bore so that the deformable portion is press fit in the bore.

10. The method of claim 9 wherein the obtaining a bearing assembly step is characterized by the indentation extending annularly around a longitudinal axis of the shaft.

11. The method of claim 10 wherein the obtaining an actuator body is characterized in that the bore is stepped and defined by a first bore and a concentric second bore that has a smaller diameter than the diameter of the first bore.

12. The method of claim 11 wherein the obtaining a bearing assembly step is characterized by the rigid portion defining a first diameter on one side of the indentation providing a slip fit with the first bore, and wherein the deformable portion defines a cylindrical surface on the opposing side of the indentation having a second diameter that is substantially the same as the first diameter, the cylindrical surface sized to provide a press fit in the second bore.

13. The method of claim 12 wherein the obtaining a bearing assembly step is characterized by the bearing being a first bearing and the rigid portion being a first rigid portion and the deformable portion being a first deformable portion, the bearing assembly having a second bearing with an inner race that is affixed to the shaft and an outer race that is rotatable relative to the second bearing's inner race, the sleeve having a second rigid portion circumscribing the second bearing's outer race and affixed thereto, and the sleeve further having a second deformable portion depending from the second rigid portion and entirely disposed longitudinally distant from the second bearing's outer race, the second deformable portion sized to deform when press fit into the first bore to operably align the shaft in the first bore.

14. The method of claim 13 wherein the obtaining a bearing assembly step is characterized by the indentation being a first indentation, the second deformable portion defining a second indentation forming a thickness of the sleeve that is less than a thickness of the second rigid portion.

15. The method of claim 14 wherein the obtaining a bearing assembly step is characterized by the second indentation extending annularly around the longitudinal axis of the shaft.

16. The method of claim 15 wherein the obtaining a bearing assembly step is characterized by the second rigid portion defining a diameter that is substantially the same as the first diameter of the first rigid portion on one side of the second indentation to provide the slip fit with the first bore, and wherein the second deformable portion has a cylindrical surface on the opposing side of the second indentation defining a third diameter that is greater than the first diameter.

17. The method of claim 16 wherein the obtaining the bearing assembly step is characterized by the sleeve defining a cylindrical portion connecting the first rigid portion and the second rigid portion together, the first deformable portion being disposed longitudinally opposite the cylindrical portion across the first rigid portion and the second deformable portion being disposed longitudinally opposite the cylindrical portion across the second rigid portion.

18. An actuator assembly, comprising:
   an actuator defining a bore; and
   means for press fitting a cartridge bearing assembly into the bore by deforming predefined deformable portions of the cartridge bearing assembly without deforming or displacing bearing surfaces of opposing races in the cartridge bearing assembly and thereby not adversely diminishing the performance of the cartridge bearing assembly.

\* \* \* \* \*